United States Patent
Da Palma et al.

(10) Patent No.: US 7,822,190 B2
(45) Date of Patent: Oct. 26, 2010

(54) METHOD, SYSTEM, AND APPARATUS FOR DEBUGGING A LIVE TELEPHONE CALL

(75) Inventors: William V. Da Palma, Coconut Creek, FL (US); Brett J. Gavagni, Coconut Creek, FL (US); Brien H. Muschett, Palm Beach Gardens, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 11/142,203

(22) Filed: Jun. 1, 2005

(65) Prior Publication Data

US 2006/0274660 A1    Dec. 7, 2006

(51) Int. Cl.
  *H04M 7/00*   (2006.01)
  *H04M 3/08*   (2006.01)
  *G06F 9/44*   (2006.01)
  *H04L 12/66*  (2006.01)

(52) U.S. Cl. ............... 379/221.01; 379/15.01; 717/124; 370/352

(58) Field of Classification Search ......... 370/216, 370/218, 241, 251, 351–356; 379/15.01, 379/221.01–221.07, 265.09; 709/203, 227; 717/124; 714/748
See application file for complete search history.

(56) References Cited

U.S. PATENT DOCUMENTS

| | | | |
|---|---|---|---|
| 5,832,196 A * | 11/1998 | Croslin et al. | 714/4 |
| 6,023,581 A * | 2/2000 | Matsuura | 714/4 |
| 6,363,065 B1 * | 3/2002 | Thornton et al. | 370/352 |
| 6,792,555 B2 * | 9/2004 | Sharma | 714/4 |
| 6,868,080 B1 * | 3/2005 | Umansky et al. | 370/354 |
| 6,898,186 B2 * | 5/2005 | Doty et al. | 370/244 |
| 7,139,263 B2 * | 11/2006 | Miller et al. | 370/352 |
| 7,539,127 B1 * | 5/2009 | Shaffer et al. | 370/216 |
| 2003/0056198 A1 * | 3/2003 | Al-Azzawe et al. | 717/127 |
| 2004/0073658 A1 * | 4/2004 | Oran et al. | 709/224 |
| 2004/0107238 A1 * | 6/2004 | Orton et al. | 709/200 |
| 2005/0193264 A1 * | 9/2005 | Khan et al. | 714/38 |

* cited by examiner

*Primary Examiner*—Curtis Kuntz
*Assistant Examiner*—Mohammad K Islam
(74) *Attorney, Agent, or Firm*—Cuenot, Forsythe & Kim, LLC

(57) ABSTRACT

A method of debugging a telephone call can include, using Session Initiation Protocol (SIP) formatted messages, initiating a debug session between a debugger and a call server for a telephone call established over at least a portion of a packet-switched network. A debug function can be invoked within the call server as specified by a SIP formatted message originating from the debugger. The method further can include determining fault information pertaining to the telephone call using the debug function and sending a SIP formatted response from the call server to the debugger.

20 Claims, 2 Drawing Sheets

METHOD, SYSTEM, AND APPARATUS FOR DEBUGGING A LIVE TELEPHONE CALL

BACKGROUND

1. Field of the Invention

The present invention relates to telephony and, more particularly, to fault detection and resolution relating to telephone calls conducted, at least in part, over a packet-switched communication network.

2. Description of the Related Art

Telephony is the technology associated with the electronic transmission of voice, fax, or other information between distant parties using systems historically associated with the telephone. Conventional telephony networks are referred to as "circuit-switched" networks. A circuit-switched network generally routes traffic between a calling party and a called party over the Public Switched Telephone Network (PSTN). To establish a telephone call in the PSTN, switching centers must maintain a continuous electrical circuit between the calling party and the called party for the duration of the telephone call.

By comparison, Internet Protocol (IP) telephony refers to the use of packet-switched connections which commonly use IP to exchange voice, fax, and other forms of information. Rather than maintaining a continuous electrical circuit, communications exchanged over a packet-switched network take the form of packets of data being sent between the calling party and the called party.

The advent of IP telephony has led to the development of many new telephony features and capabilities. Despite such advances, the ability to debug faults for telephone calls remains limited. In particular, conventional debugging techniques for telephony systems lack the ability to debug a live or in-progress telephone call. Such is the case as conventional telephony systems are debugged using a simulation environment in which test calls are conducted. Simulation environments are "offline" systems which do not communicate with actual production telephony systems. As such, simulation environments have no ability to intercept a live telephone call in a production environment.

It would be beneficial to provide a technique for debugging live or in-progress telephone calls within an IP or packet-switched telephony environment which overcomes the limitations described above.

SUMMARY OF THE INVENTION

The present invention provides a solution for debugging a live telephone call within a packet-switched communication network. One embodiment of the present invention can include a method of debugging an ongoing telephone call. The method can include detecting, via a call server, a fault in the ongoing telephone call and, responsive to detecting the fault, initiating a debug session between a debugger and the call server using Session Initiation Protocol (SIP) formatted messages. A debug function can be invoked within the call server as specified by a SIP formatted message originating from the debugger. The method further can include determining fault information pertaining to the ongoing telephone call using the debug function within the call server and sending a SIP formatted response from the call server to the debugger.

Another embodiment of the present invention can include a system for debugging an ongoing telephone call. The system can include a call server configured to detect a fault in the ongoing telephone call and a debugger configured to conduct a debug session for the ongoing telephone call using SIP formatted messages. The call server can be configured to determine fault information pertaining to the ongoing telephone call responsive to SIP formatted messages originating from the debugger. The call server can be configured to communicate the fault information to the debugger using SIP formatted messages. The debugger can be configured to conduct a debug session responsive to the call server detecting the fault in the ongoing telephone call.

Yet another embodiment of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a method, system, and apparatus for debugging telephone calls and, particularly, live, or in-progress telephone calls. In accordance with the inventive arrangements disclosed herein, a debugger and a call server can be configured to communicate with one another using Session Initiation Protocol (SIP) messages. The debugger can send SIP formatted debug instructions to the call server. The call server responsively can execute one of more debug functions to collect fault information pertaining to a live telephone call. The fault information can be formatted using SIP and then sent from the call server to the debugger for analysis.

SIP is an Internet Engineering Task Force (IETF) standard protocol for initiating an interactive user session that involves multimedia elements such as video, voice, chat, gaming, and virtual reality. SIP functions within the application layer of the Open Systems Interconnection (OSI) communications model and is commonly used to provide the signaling necessary for Internet Protocol (IP) based telecommunication services. Accordingly, SIP provides basic functions such as setup, control and tear down of IP call sessions as well as more advanced functions such as call forwarding, number delivery, authentication, and the like.

Figure 1:
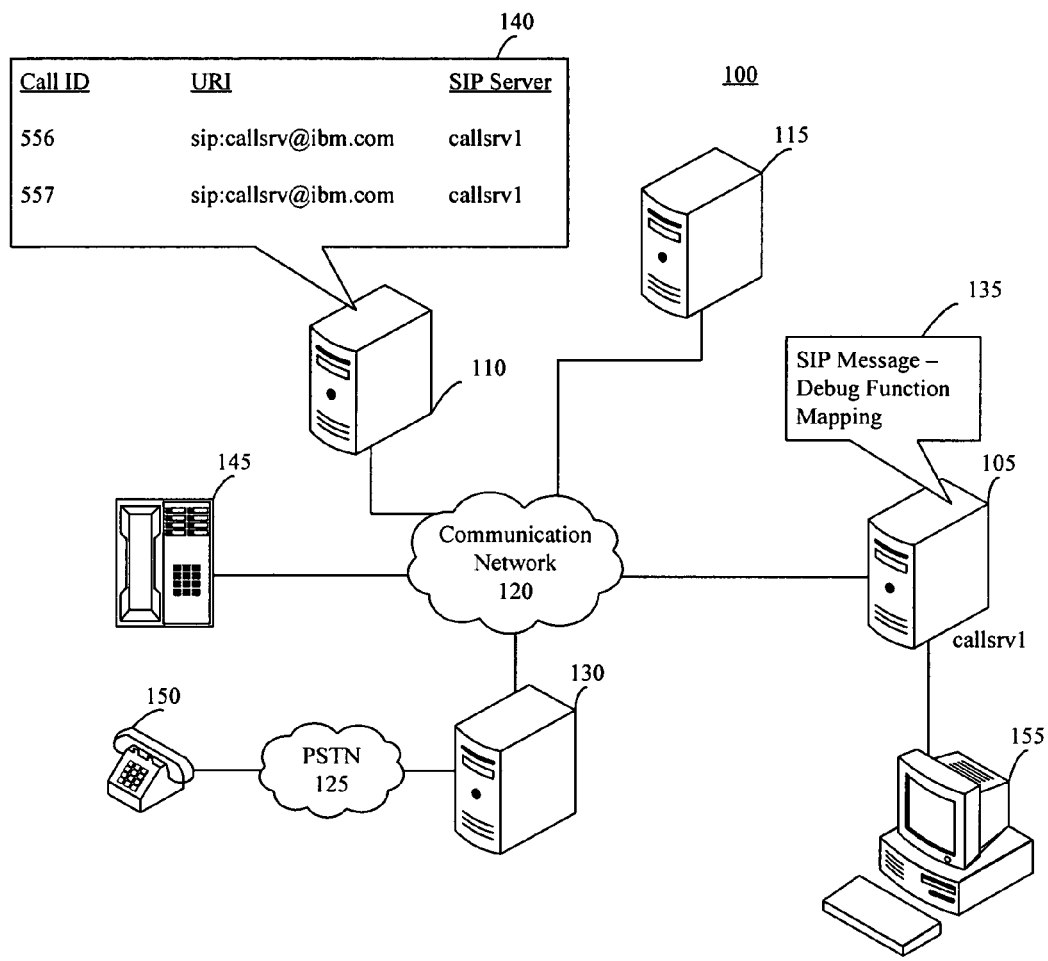
FIG. 1 is a schematic diagram illustrating a system for debugging live telephone calls in accordance with one embodiment of the present invention.

FIG. 1 is a schematic diagram illustrating a system 100 for debugging live telephone calls in accordance with one embodiment of the present invention. The system can include a call server 105, a proxy server 110, and a debugger 115. The call server 105, the proxy server 110, and the debugger 115, each can be implemented as a collection of one or more computer programs executing within suitable information processing systems, whether computers, servers, or the like. Though FIG. 1 depicts each of these components as being located within a separate, independent information processing system, this need not be the case. That is, one or more of the aforementioned components can be located within a same information processing system. Thus, the debugger 115, for example, can be located within the same processing system as the call server 105 or the proxy server 110.

The call server 105, the proxy server 110, and the debugger 115 can communicate with one another via a communication network 120. The communication network 120 can be implemented, at least in part, as a packet-switched network such as the Internet, the World Wide Web, an intranet, a Local Area Network, a Wide Area Network, or the like. The communication network 120 can be connected with the Public Switched Telephone Network (PSTN) 125 through a suitable gateway interface 130. Though not shown, it should be appreciated that other networks also can be connected to the communication network 120 such as wireless mobile networks and the like.

The call server 105 can be configured to perform Internet Protocol (IP) telecommunication functions. In one embodiment, the call server 105 can be implemented as a SIP server. Notwithstanding, the call server 105 can include several additional enhancements which enable the functions described herein. The call server 105 can include a data structure specifying a mapping 135 of SIP messages to various debug functions available within the call server 105. The debug functions can support debugging of live telephone calls being conducted through the call server 105. The various software components within the call server 105 which implement the debug functions or methods can be configured for control via the SIP messages mapped thereto through mapping 135. Further, mapping 135 can associate debug events or information pertaining to faults within the call server 105 to outgoing SIP messages.

The proxy server 110 can be configured to support the various functions and debugging messaging disclosed herein. The proxy server 110 can provide load balancing and control over various call servers such as call server 105. In one embodiment, for example, the proxy server 110 can be implemented as a SIP proxy server having extended debug messaging functionality. A SIP proxy server implementation is capable of providing a single point of control of a SIP session with a SIP server. The SIP proxy server has knowledge of the state of the SIP session for message validation, security information, and the like.

In any case, the proxy server 110 can be located within a telephone call path between the end points of the telephone call or session. The endpoints can be callers, call recipients, automated phone services such as interactive voice response systems (IVRs), the debugger 115, etc. As calls are established through the proxy server 110, a data structure specifying a mapping 140 of call identifiers to universal resource identifiers (URIs) and destination call servers can be maintained. Using mapping 140, the proxy server 110 can direct debug requests to the correct destination call server 105.

The debugger 115 can be any of a variety of commercially available debuggers or custom coded debugging solutions. The debugger 115, whether a custom or a commercially available solution, can be configured with SIP messaging capability so that commands for debugging and received debug or fault information can be sent and received respectively using SIP formatted messages. Thus, the debugger 115 can send debug commands formatted as SIP messages. These debug commands can specify a particular ongoing telephone call or SIP session to be debugged. The debug commands issued by the debugger 115 further can indicate that a connection with the call server which is carrying the designated call is desired.

In operation, a caller can initiate a telephone call over at least a portion of a packet-switched network. The telephone call can be initiated from an IP telephone 145, or a conventional telephone 150 which can connect to the communication network 120 via PSTN 125 and gateway 130. In any case, the call can be placed to a recipient (not shown) which is connected to the call server 105. The call can be directed to a recipient such as an actual person associated with a given address, an automated telephone service such as one provided by an IVR, or a gateway.

When the call is placed, a call identifier can be created which uniquely identifies the call. A SIP client or agent, whether disposed in the IP telephone 145, in the communications network 120, or elsewhere, can generate the call identifier. The call identifier can uniquely specify the call session that is to be setup as well as the destination call server. The SIP client associated with the caller can send a SIP INVITE specifying the call identifier to the proxy server 110. The proxy server 110, in turn, can make an entry in the mapping 140 corresponding to the SIP INVITE. The proxy server 110 can use the call identifier specified within the SIP INVITE or can generate its own call identifier which uniquely identifies the call.

Continuing with this example, mapping 140 now includes a call identifier "557" which indicates that a call is being placed to the call server 105 having an address of "sip:callsrv@ibm.com". The proxy server 110 can forward the SIP INVITE to the call server, which receives the SIP INVITE and processes or establishes the call identified by call identifier 557. It should be appreciated that SIP addresses cases in which more or less complex call routing is required, whether the call originates in communication network 120, the PSTN 125, or another network. As such, the illustration of call setup disclosed herein is not intended as a limitation of the present invention.

At some point during the telephone call, the call server 105 can detect a fault condition relating to the telephone call. An alert can be generated. Responsive to the alert or fault notification, a debugging session can be initiated with the debugger 115. This can occur automatically, where the call server 105 automatically invokes a debug session responsive to detecting the fault condition, or can occur upon request of a system administrator through console 155.

In any case, once initiated, the debugger 115 and the call server 105 can communicate to conduct a debug session using one or more SIP formatted messages. In illustration, the call server 105 can be configured to respond to particular SIP messages requesting debug functions which originate from the debugger 115. A SIP message such as SIP INFO, for example, can be modified to include a debug header field which identifies the message as a debug request.

The SIP INFO message can be used for communicating mid-session signaling information along the signaling path of a telephone call. The SIP INFO message is not used to change the state of SIP calls or the state of sessions initiated using SIP, but rather to provide additional, optional information which can further enhance the functionality of system 100, for example the call server 105.

The signaling path for the SIP INFO method typically is the signaling path established as a result of the call setup. This can be either direct signaling between the calling and called user agents or a signaling path involving the proxy server 110 that was involved in the call setup and, as such, added itself to the Record-Route header on the initial SIP INVITE message. The mid-session information can be communicated in either a SIP INFO message header or as part of a message body.

Once the debug session is initiated, the debugger 115 can send debug requests and/or commands to the call server 105. These commands can be mapped to particular functions, or components, through mapping 135. The available debug functions or components within the call server 105 can include appropriate interfaces such that each component can be accessed via an appropriate SIP formatted message from the debugger 115 or the proxy server 110. Information determined in response to the debug commands can be formatted by the call server 105 using SIP and sent to the debugger 115, whether routed through the proxy server 110 or not.

In another embodiment of the present invention, the debugger 115 can be implemented as a Voice Extensible Markup Language (VoiceXML) debugger. As known, VoiceXML is used to program telephony applications. In such an embodiment, the debugger 115, configured as a VoiceXML debugger, can be configured to behave as the proxy server 110, or SIP proxy server. The call server 105 can be configured to execute VoiceXML applications and include SIP messaging functionality as described herein. For example, the call server 105 can be implemented as a VoiceXML server.

In this configuration, a user can place a telephone call via telephone 145 or 150. The user-agent of the caller, i.e. a SIP client, can place a telephone call to the proxy server 110, which includes the VoiceXML debugger. The proxy server 110, in turn, can forward the message to the call server 105, which includes the call recipient user-agent. The necessary signaling messages, i.e. SIP messages, are exchanged by both user-agents through the proxy server 110. Accordingly, the VoiceXML debugger, as part of, or functioning as, the proxy server 110, is aware of the exact session information, or call, if debugging is desired.

Once the call is established, the debugger 115 can request the VoiceXML interpreter within the call server 105 that is assigned to handle the telephone call to operate in "debug mode" and exchange debugging information. The debugging information can be exchanged using SIP, for example embedded in SIP-INFO messages. It should be appreciated that the present invention is not limited to a VoiceXML debugger. That is, a debugger suited to any of a variety of voice-based markup languages which can be used for IP telephony can be used in accordance with the inventive arrangements disclosed herein.

Whether the debugger is implemented as described with reference to FIG. 1 or as a VoiceXML debugger, the audio exchanged during a debug session can remain unchanged. The live telephone call can be established and the same user-agents and connection path, without any additional proxying, can be maintained. This results in the same experience for a user with respect to the audio quality of the telephone call, regardless of whether a debug session is initiated.

Figure 2:
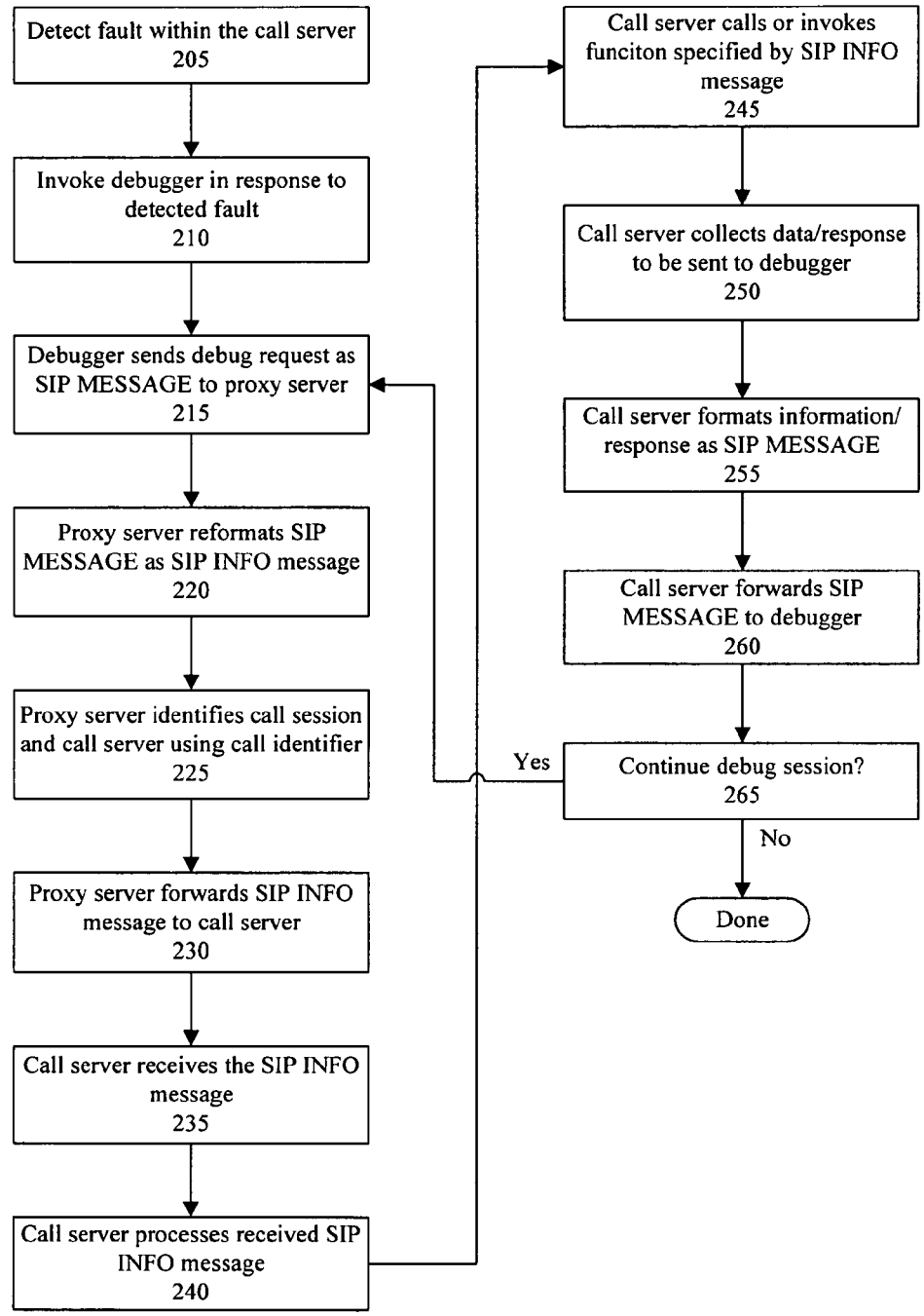
FIG. 2 is a flow chart illustrating a method of debugging a telephone call in accordance with another embodiment of the present invention.

FIG. 2 is a flow chart illustrating a method 200 of debugging a telephone call in accordance with another embodiment of the present invention. The method 200 can begin in a state where an IP telephone call has been established between two endpoints over a system such as the one described with reference to FIG. 1. Accordingly, the method 200 can begin in step 205, where a fault is detected within the call server. For example, an application-driven failure such as a VoiceXML "nomatches" fault or "noinputs" fault can be detected.

Responsive to the fault detection, the debugger can be invoked in step 210. As noted, in one embodiment, the debugger can be triggered automatically by the call server. For example, responsive to detecting the fault, the call server can send a message to the debugger requesting a debug session. In another embodiment, a system operator can invoke the debugger after noticing the fault detection within the call server. In either case, the debugger can be provided with information identifying the particular call session involved with the fault as well as any proxy servers in the call chain and the call server.

Still, the present invention is not so limited. That is, the debugger can be called under any of a variety of circumstances regardless of whether a fault is detected. For example, in one embodiment, the debugger can be engaged automatically when a call is setup or initiated. In another embodiment, the debugger can be engaged any time one wishes to step-through a given call for testing purposes.

In any case, the process of joining the debugger into the existing or ongoing call can begin. In step 215, the debugger can issue a SIP MESSAGE to the proxy server. The SIP MESSAGE can specify a request for debugging and, as such, can specify a call identifier. Unlike the SIP INFO message, the SIP MESSAGE can be sent to any SIP user-agent without requiring an established session. In step 220, the proxy server can reformat the received SIP MESSAGE as a SIP INFO message. In step 225, the proxy server can access its internally stored mapping of call identifiers to determine the particular call session, i.e. telephone call, and call server which are the subject of the debug request. The SIP INFO message can be forwarded from the proxy server to the call server in step 230.

The SIP INFO message provides the proxy server with a bidirectional mechanism for debugging the call server. As noted, SIP INFO messages can be used during a SIP session. Because the proxy server has already established a SIP session with the call server upon call setup, the proxy server is able to use SIP INFO messages to initiate the debug session during the call session or telephone call.

It should be appreciated that in cases where no proxy server is used within the call chain, the debugger can communicate directly with the call server. In that case, the debugger can maintain any call routing information as may be required. Further, the debugger can be configured to send SIP INFO messages directly to the call server rather than relying on the proxy server as an intermediary which translates SIP MESSAGES into SIP INFO messages.

In step 235, the call server can receive the SIP INFO message. The instructions specified by the SIP INFO message can be identified by the call server and processed in step 240. In illustration, the SIP INFO message can specify a variety of different instructions including, but not limited to, obtain the call server debug capabilities, obtain fault information, pause, resume, or the like. Further, the SIP INFO message can specify a particular debug function to be called. For example, one or more fields within the SIP INFO message can be associated with different debug functions. Accordingly, in step 245, the call server accesses this internal mapping to select, and then call or invoke, the appropriate functions, i.e. methods, responsive to receiving the SIP INFO message. Thus, the various methods of the call server which are to be accessible by the debugger must be configured with an interface that corresponds to the debug requests.

It should be appreciated that while the methods called can pertain to debug functions which collect data, such methods also can perform other administrative functions such as responding to the debugger with the debug capabilities of the call server and the like. Thus, at the start of the debug session, an exchange of information can occur between the debugger and the call server in which the debug capabilities of the call server are identified by the debugger. Debugging actions, or capabilities, can include, but are not limited to, verification of call data or application data, changing application context, etc. The debugger, accordingly, becomes aware of the actions that can be performed by the call server. This allows the debugger to respond to the call server with more specific instructions as to the type of function or action to be performed. The messages exchanged can be formatted as SIP messages.

After performing any requested action, the call server, in step 250, can collect the data that is to be provided back to the debugger. Such data can be collected, for example, as part of the invoked debug function. In step 255, this information can be formatted by the call server as a SIP MESSAGE. Accordingly, the proxy server can forward the SIP MESSAGE from the call server to the debugger in step 260. The debugger can process the received information. Based upon the response provided, a determination can be made in step 265 as to whether to continue the debug session and repeat until such time that the debug session is complete or end. It should be appreciated, however, that the initial information exchange which informs the debugger of the debug capabilities of the call server need not be performed for subsequent iterations of the method.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of debugging an ongoing telephone call comprising:
   detecting, via a call server, a fault in the ongoing telephone call;
   responsive to detecting the fault, initiating a debug session for the ongoing telephone call between a debugger and the call server using Session Initiation Protocol (SIP) formatted messages;
   invoking a debug function within the call server as specified by a SIP formatted message originating from the debugger;
   determining fault information pertaining to the ongoing telephone call using the debug function within the call server; and
   sending a SIP formatted response from the call server to the debugger.

2. The method of claim 1, wherein initiating a debug session for the ongoing telephone call between a debugger and the call server using Session Initiation Protocol (SIP) formatted messages further comprises:
   the call server, responsive to detecting the fault, automatically initiating the debug session within the debugger.

3. The method of claim 1, said initiating step further comprising the debugger sending a SIP formatted message specifying a debug request to the call server.

4. The method of claim 3, said initiating step further comprising the call server advising the debugger, responsive to the debug request, of available debug functions within the call server via a SIP formatted message.

5. The method of claim 3, wherein the SIP formatted message specifying the debug request is sent by way of a proxy server which functions as an intermediary between the debugger and the call server, wherein the debug request specifies a SIP session and the call server corresponding to the call.

6. The method of claim 3, said initiating step further comprising the debugger sending a SIP INFO message directly to the call server, wherein the SIP INFO message specifies the telephone call.

7. The method of claim 5, wherein the SIP formatted message specifying the debug request is a SIP MESSAGE that is received by the proxy server, said initiating step further comprising:
   the proxy server formatting the SIP MESSAGE as a SIP INFO message, wherein the SIP INFO message specifies the debug request; and
   the proxy server sending the SIP INFO message to the call server joining the debugger into the ongoing telephone call.

8. The method of claim 4, said invoking step further comprising the debugger selecting a debug function from the available debug functions within the call server responsive to the call server advising the debugger, wherein the call server identifies the debug function from the debug request.

9. A system for debugging an ongoing telephone call comprising:
   a call server configured to detect a fault in the ongoing telephone call;
   a debugger configured to conduct a debug session for the ongoing telephone call and to communicate with said call server using Session Initiation Protocol (SIP) formatted messages;
   wherein said call server is further configured to determine fault information pertaining to the ongoing telephone call responsive to the SIP formatted messages originating from said debugger, and to communicate the fault information to said debugger using SIP formatted messages; and
   wherein said debugger is configured to conduct the debug session responsive to said call server detecting the fault in the ongoing telephone call.

10. The system of claim 9, wherein said debugger initiates the debug session with said call server by sending a SIP INFO message directly to said call server, wherein the SIP INFO message specifies the ongoing telephone call.

11. The system of claim 9, wherein said call server, responsive to detecting the fault, is configured to automatically initiate the debug session within the debugger.

12. The system of claim 9, further comprising a proxy server configured to serve as an intermediary between said debugger and said call server, wherein said debugger sends a SIP MESSAGE specifying a debug request to said proxy server, wherein the SIP MESSAGE specifying the debug request specifies the ongoing telephone call and a debug function to be invoked in said call server, wherein said proxy server formats the SIP MESSAGE specifying the debug request as a SIP INFO message and forwards the SIP INFO message to said call server.

13. A machine readable storage, having stored thereon a computer program having a plurality of code sections executable by a machine for causing the machine to perform the steps of:

detecting, via a call server, a fault in an ongoing telephone call;

responsive to detecting the fault, initiating a debug session for the ongoing telephone call between a debugger and the call server using Session Initiation Protocol (SIP) formatted messages;

invoking a debug function within the call server as specified by a SIP formatted message originating from the debugger;

determining fault information pertaining to the ongoing telephone call using the debug function within the call server; and sending a SIP formatted response from the call server to the debugger.

14. The machine readable storage of claim 13, the call server, responsive to detecting the fault, automatically initiates the debug session within the debugger.

15. The machine readable storage of claim 13, said initiating step further comprising the debugger sending a SIP formatted message specifying a debug request to the call server.

16. The machine readable storage of claim 15, said initiating step further comprising the call server advising the debugger, responsive to the debug request, of available debug functions within the call server via a SIP formatted message.

17. The machine readable storage of claim 15, wherein the SIP formatted message specifying the debug request is sent by way of a proxy server which functions as an intermediary between the debugger and the call server, wherein the debug request specifies a SIP session and the call server corresponding to the call.

18. The machine readable storage of claim 15, said initiating step further comprising the debugger sending a SIP INFO message directly to the call server, wherein the SIP INFO message specifies the telephone call.

19. The machine readable storage of claim 17, wherein the SIP formatted message specifying the debug request is a SIP MESSAGE that is received by the proxy server, said initiating step further comprising:

the proxy server formatting the SIP MESSAGE as a SIP INFO message, wherein the SIP INFO message specifies the debug request; and the proxy server sending the SIP INFO message to the call server joining the debugger into the ongoing telephone call.

20. The machine readable storage of claim 16, said invoking step further comprising the debugger selecting a debug function from the available debug functions within the call server responsive to the call server advising the debugger, wherein the call server identifies the debug function from the debug request.

* * * * *